(12) United States Patent
Srinathan (10) Patent No.: US 12,483,398 B2
(45) Date of Patent: Nov. 25, 2025

(54) SYSTEM AND METHOD FOR PROVEN SECRET KEY AGREEMENT BETWEEN INITIATING UNIT AND RESPONDING UNIT

(71) Applicant: International Institute of Information Technology, Hyderabad, Hyderabad (IN)

(72) Inventor: Kannan Srinathan, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 154 days.

(21) Appl. No.: 18/279,886

(22) PCT Filed: Mar. 1, 2022

(86) PCT No.: PCT/IN2022/050176
§ 371 (c)(1),
(2) Date: Sep. 1, 2023

(87) PCT Pub. No.: WO2022/185336
PCT Pub. Date: Sep. 9, 2022

(65) Prior Publication Data
US 2024/0154797 A1    May 9, 2024

(30) Foreign Application Priority Data
Mar. 1, 2021   (IN) .............................. 202141008606

(51) Int. Cl.
H04L 9/40    (2022.01)
H04L 9/08    (2006.01)

(52) U.S. Cl.
CPC .......... H04L 9/0869 (2013.01); H04L 9/0825 (2013.01); H04L 9/0838 (2013.01)

(58) Field of Classification Search
CPC ... H04L 9/0869; H04L 9/0825; H04L 9/0838; H04L 9/0861
See application file for complete search history.

(56) References Cited

U.S. PATENT DOCUMENTS

| | | | |
|---|---|---|---|
| 2015/0156018 A1* | 6/2015 | Ohya | H04L 9/0869 380/46 |
| 2017/0373841 A1* | 12/2017 | Nagai | G09C 1/00 |
| 2019/0334702 A1* | 10/2019 | Heisrath | G06F 21/76 |

* cited by examiner

Primary Examiner — Thaddeus J Plecha (57) ABSTRACT

A system and method for establishing a secure communication agreement between an initiating unit 102 and a responding unit 104 through a channel 106 are provided. The method includes generating, using first set of local random numbers, multi-dimensional matrices by an initiating unit. The method includes computing a transcript by the initiating unit based on multi-dimensional matrices and communicating to the responding unit. The method includes determining response by selecting a subset of the transcript to communicate response to the initiating unit. The method includes iteratively generating, communicating a subsequent transcript and waiting for a subsequent response from the responding unit for one or more times. The method includes computing a secret key as a function of the first set of local random numbers, the second set of local numbers, the subsequent transcripts, the subsequent responses at each iteration, and the indices of the selected subset J.

10 Claims, 7 Drawing Sheets

SYSTEM AND METHOD FOR PROVEN SECRET KEY AGREEMENT BETWEEN INITIATING UNIT AND RESPONDING UNIT

BACKGROUND

Technical Field

The embodiments herein generally relate to communication security, more particularly to a system and method for establishing a secure communication agreement between an initiating unit and a responding unit through a channel to enable confidentiality, integrity, and authenticity of data.

Description of the Related Art

A key agreement protocol is a protocol by which two or more parties can agree on a key in such a way that both parties influence the outcome. In cryptography, key agreement protocols are designed to solve the problem of confidentially when establishing a secret key between two or more parties without letting an unauthorized third-party intercept, infer or otherwise obtain the secret key. Symmetric key cryptography is the primary approach to securely communicate between any two parties. Symmetric key cryptography is based on the assumption that the two communicating parties can agree upon a shared key securely. This step is referred to as Secret Key Agreement, SKA.

The primary attribute of any SKA protocol is: "Any computationally bounded third-party interceptor should succeed in learning anything about the key only with a negligible probability". However, meeting this goal from scratch has been a challenge, so much so that the goal is achieved using certain hardness assumptions.

A known secret-key agreement protocol that is believed to meet the security criteria is the Diffie-Hellman protocol, where two parties jointly exponentiate a generator with random numbers, which in principle, provides enciphered communication between two or more parties, without the necessity of them agreeing on an enciphering key beforehand. The Diffie-Hellman protocol is based on the conjectured hardness of the decisional Diffie-Hellman (DDH) problem. But if this conjecture is shown to be false, the security of the corresponding SKA system may get compromised.

A known public-key cryptography protocol El-Gamal Public Key Cryptography PKC protocol has no proven security (yet) as El-Gamal PKC protocol, which assumes the hardness of the DDH problem, which in turn assumes that the Discrete Logarithm problem has no polynomial-time solution. A known RSA (Rivest-Shamir-Adleman) PKC protocol is in use, but the RSA PKC protocol assumes that the Integer-Factorization problem has no polynomial-time solution. There is another existing protocol called the N-th degree truncated polynomial ring (NTRU) PKC protocol. But NTRU PKC protocol requires high computations and also has no proven security.

Another existing solution is Elliptic curve cryptography. Elliptic curve cryptography assumes that the elliptic curve discrete logarithm problem has no polynomial-time solution, which is not proven to date. Also, Elliptic curve cryptography requires high computations. Another existing protocol, Paillier PKC is based on the decisional composite residuosity assumption, another unproven assumption.

In short, all known cryptographic protocols based on complexity theory are founded on assumptions or computational hardness conjectures. The computational hardness conjecture is a hypothesis that a particular problem cannot be solved efficiently, where efficiently typically means in polynomial time in the security parameter.

An approach that is independent of complexity theory is Quantum Key Agreement, which relies on quantum uncertainty. However, this approach requires additional quantum-mechanical infrastructure and does not work over long distances. Ironically the same theory (quantum mechanics) that provides us with this protocol also leads to computers that can break most of the conjecture-based protocols.

Accordingly, there remains a need for a more efficient system and method for mitigating and/or overcoming drawbacks associated with current methods.

SUMMARY

In view of the foregoing, an embodiment herein provides a system for establishing a secure communication agreement between an initiating unit and a responding unit through a channel. The system includes an initiating unit and a responding unit in communication with each other using the channel. The initiating unit generates at least one multi-dimensional matrix M using a first set of local random numbers $(r_I)$ for a specified input parameters. The first set of local random numbers $(r_I)$ is known only to the initiating unit. The initiating unit computes a transcript $(T_I)$ based on the at least one multi-dimensional matrix M. The initiating unit communicates the transcript $(T_I)$ to the responding unit. The initiating unit waits for a response from the responding unit after communicating the transcript $(T_I)$. The responding unit, upon receiving the transcript $(T_I)$ from the initiating unit, determines a response $(T_R)$ by selecting a subset of the transcript $(T_I)$ by the responding unit. The responding unit 104 communicates the response $(T_R)$ to the initiating unit. The subset of the transcript $(T_I)$ is selected after verifying the transcript $(T_I)$ for one or more constraints, based on a second set of local random numbers $(r_R)$. Upon receiving the response $(T_R)$ from the responding unit, the initiating unit iteratively generates, communicates a subsequent transcript, and waits for a subsequent response from the responding unit for one or more times as per requirement. Each of the subsequent transcript and the subsequent response at each iteration includes a subset of the subsequent transcript, the subsequent response at a previous iteration that satisfies one or more constraints verified using the subsequent transcript, the subsequent response at the previous iteration, and the first set of local random numbers $(r_I)$, the second set of local numbers $(r_R)$. The indices of the selected subset based on one or more constraints are referred to as J. The initiating unit and responding unit compute a secret key as a function of the first set of local random numbers $(r_I)$, the second set of local numbers $(r_R)$, the subsequent transcripts, the subsequent responses at each iteration, and the indices of the selected subset J. Hence a secure communication agreement is established between the initiating unit and the responding unit through the channel based on computed secret key to enable confidentiality integrity and authenticity of data without revealing the secret key to an unauthorized third-party unit.

In some embodiments, the initiating unit and the responding unit compute the secret key by (i) computing an intermediate set of values ($t_{I_j}$ and $t_{R_j}$) for which ($t_{I_j} + t_{R_j}$) is not equal to zero in Zp, a first function ($f_{snz}$) is a non-zero sum on $t_{I_j}$ and $t_{R_j}$ that is feebly correct and feebly private; (ii) verifying correctness of the first function ($f_{snz}$) to obtain a subset of $t_{I_j}$ and $t_{R_j}$ for which the function ($f_{snz}$) is fully correct and feebly private, the first function ($f_{snz}$) is fully correct when $(t_{Ij}+t_{Rj})$ is not equal to zero in Zp for all j in the subset; (iii) estimating a set of values $\Gamma_I$, $\Gamma_R$, $Y_I$ and $Y_R$ using the first set of local random numbers $(r_I)$, the second set of local numbers $(r_R)$ and securely verifying $\Gamma_I\Gamma_R=Y_I+Y_R$ called as a second function $f_{sm}$ using $t_{Ij}$ and $t_{Rj}$ where the verification of $\Gamma_I \Gamma_R=Y_I+Y_R$ in $Z_3$ includes checking $(\Gamma_I+\Gamma_R+1)^2+1=t_{I1}+t_{R1}\neq 0$ and $(\Gamma_I+\Gamma_R-1)^2+1=t_{I2}+t_{R2}\neq 0$ by replacing $\Gamma_I\Gamma_R$ with $Y_I+Y_R$ in the expansion of $(\Gamma_I+\Gamma_R+1)^2$ and $(\Gamma_I+\Gamma_R-1)^2$ such that the second function $f_{sm}$ is now fully correct and feebly private; (iv) computing a set of secret keys ($K_I$ and $K_R$) that are fully correct and feebly private using the set of values, wherein $K_I=\Gamma_I\Gamma_R-Y_I$ and $K_R=Y_R$ by publishing $\Gamma_I$ and $\Gamma_R$; and (v) computing a set of secret keys ($K_I$ and $K_R$) that are fully correct and feebly private using the set of values, $K_I=\Gamma_I\Gamma_R-Y_I$ and $K_R=Y_R$ by publishing $\Gamma_I$ and $\Gamma_R$.

In some embodiments, the processor is configured to select the first set of local random numbers $(r_I)$ or the second set of local numbers $(r_R)$ in Zp by the initiating unit or the responding unit arbitrarily as per pre-specified distributions and make random guesses of $G_{Rj}$ and $G_{Ij}$ such that their desired sum is $(r_R+r_I)^j$, which is then verified for correctness, Zp is a finite field that is used in abstract algebra.

In some embodiments, the processor is configured to verify in Zp the correctness of sum of $G_{Rj}$ and $G_{Ij}$ as $(r_I+r_R)^j$ by computing $(r_I+r_R+i)^{p-1}$ for different values of i and verifying the answer as one as long as $(r_I+r_R+i)$ is non-zero, where $(r_I+r_R+i)^{p-1}$ is obtained by a linear combination of $G_{Rj}$ and $G_{Ij}$ for different values of i, which is locally computed as $h_{Ri}$ and $h_{Ii}$ and verifying whether $(h_{Ri}+h_{Ii})$ is 1 for all i, thereby resulting in an improved correctness and feebly privacy of $G_{Rj}$ and $G_{Ij}$.

In some embodiments, the privacy of the secret key is amplified by computing a function that is a linear combination of $G_{Rj}$ and $G_{Ij}$, the function is represented as $x_R$ and $x_I$, each of the intermediate set of values $t_I$ and $t_R$ is computed as multi-modular functions of $x_I$ and $x_R$, in particular, $t_I=((x_I \bmod p) \bmod q)$ and $t_R=((x_R \bmod p) \bmod q))$ such that $(t_I+t_R)$ is non-zero in $Z_q$, and when q is very less than p, the privacy is significantly enhanced.

In some embodiments, the correctness is amplified by further verification checks and error correction procedures, resulting in a subset J of the indices for which the first function $f_{snz}$ is fully correct and feebly private over the intermediate set of values $(t_{Ij}$ and $t_{Rj})$.

In some embodiments, the initiating unit computes the computed secret key as a function of $\Gamma_I\Gamma_R$ and $Y_I$, the responding unit generates the generated secret key as a function of $Y_R$.

In one aspect, a method for establishing a secure communication agreement between an initiating unit and a responding unit through a channel is provided. The method includes generating, using a first set of local random numbers $(r_I)$, at least one multi-dimensional matrix (M) for a specified input parameters by an initiating unit, the first set of local random numbers is known only to the initiating unit. The method includes computing, using the initiating unit, a transcript $(T_I)$ based on the at least one multi-dimensional matrix (M). The method includes communicating a transcript $(T_I)$ from the initiating unit to a responding unit, the initiating unit waits for a response from the responding unit after communicating the transcript $(T_I)$. The method includes upon receiving the transcript $(T_I)$ from the initiating unit, determining, using the responding unit, a response $(T_R)$ by selecting a subset of the transcript $(T_I)$ to communicate the response $(T_R)$ to the initiating unit, the subset of the transcript $(T_I)$ is selected after verifying the transcript $(T_I)$ for one or more constraints, based on a second set of local random numbers $(r_R)$. The method includes upon receiving the response $(T_R)$ from the responding unit, iteratively generating, communicating a subsequent transcript, and waiting for a subsequent response from the responding unit for one or more times as per requirement, each of the subsequent transcript, the subsequent response at each iteration includes a subset of the subsequent transcript, the subsequent response at a previous iteration that satisfies one or more constraints verified using the subsequent transcript, the subsequent response at the previous iteration, and the first set of local random numbers $(r_I)$, the second set of local numbers $(r_R)$, indices of the selected subset based on one or more constraints are referred to as J. The method includes computing a secret key as a function of the first set of local random numbers $(r_I)$, the second set of local numbers $(r_R)$, the subsequent transcripts, the subsequent responses at each iteration, and the indices of the selected subset J. The method includes establishing the secure communication agreement based on computed secret key between the initiating unit and the responding unit through the channel to enable confidentiality integrity and authenticity of data between the initiating unit and the responding unit without revealing the secret key to an unauthorized third-party unit.

In some embodiments, the initiating unit and the responding unit compute the secret key by (i) computing an intermediate set of values $(t_{Ij}$ and $t_{Rj})$ for which $(t_{Ij}+t_{Rj})$ is not equal to zero in Zp, a first function $(f_{snz})$ is a non-zero sum on $t_{Ij}$ and $t_{Rj}$ that is feebly correct and feebly private; (ii) verifying correctness of the first function $(f_{snz})$ to obtain a subset of $t_{Ij}$ and $t_{Rj}$ for which the function $(f_{snz})$ is fully correct and feebly private, the first function $(f_{snz})$ is fully correct when $(t_{Ij}+t_{Rj})$ is not equal to zero in Zp for all j in the subset; (iii) estimating a set of values $\Gamma_I$, $\Gamma_R$, $Y_I$ and $Y_R$ using the first set of local random numbers $(r_I)$, the second set of local numbers $(r_R)$ and securely verifying $\Gamma_I \Gamma_R=Y_I+Y_R$ called as a second function $f_{sm}$ using $t_{Ij}$ and $t_{Rj}$ where the verification of $\Gamma_I \Gamma_R=Y_I+Y_R$ in $Z_3$ includes checking $(\Gamma_I+\Gamma_R+1)^2+1=t_{I1}+t_{R1}\neq 0$ and $(\Gamma_I+\Gamma_R-1)^2+1=t_{I2}+t_{R2}\neq 0$ by replacing $\Gamma_I \Gamma_R$ with $Y_I+Y_R$ in the expansion of $(\Gamma_I+\Gamma_R+1)^2$ and $(\Gamma_I+\Gamma_R-1)^2$ such that the second function $f_{sm}$ is now fully correct and feebly private; (iv) computing a set of secret keys ($K_I$ and $K_R$) that are fully correct and feebly private using the set of values, $K_I=\Gamma_I\Gamma_R-Y_I$ and $K_R=Y_R$ by publishing $\Gamma_I$ and $\Gamma_R$; and (v) computing a set of secret keys ($K_I$ and $K_R$) that are fully correct and feebly private using the set of values, $K_I=\Gamma_I\Gamma_R-Y_I$ and $K_R=Y_R$ by publishing $\Gamma_I$ and $\Gamma_R$.

In some embodiments, the processor is configured to select the first set of local random numbers $(r_I)$ or the second set of local numbers $(r_R)$ in Zp by the initiating unit or the responding unit arbitrarily as per pre-specified distributions and make random guesses of $G_{Rj}$ and $G_{Ij}$ such that their desired sum is $(r_R+r_I)^j$, which is then verified for correctness, Zp is a finite field that is used in abstract algebra.

An important advantage of the system 100 is the achievement of unconditional security on a public channel for communication between the initiating unit 102 and the responding unit 104. The proof also provides security such that the privacy of the secure key is not compromised in the future for an indefinite time. A part of the transcript may be used by the responding unit 104 to compute the secret key, enabling us to derive a public key cryptosystem directly out of this secret key agreement, the SKA method. Furthermore, the asymmetry in complexities (computation, communication, memory, and randomness) makes the system 100 and the method well suited for heterogeneous networks.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system and method of secure key arrangement based on proven computational hardness and not conjectures. Referring now to the drawings, and more particularly to FIG. 1 through FIG. 6, where similar reference characters denote corresponding features consistently throughout the figures, preferred embodiments are shown Definitions Secret Key Agreement (SKA) protocol is a protocol by which two or more parties can agree on a key in such a way that any computationally bounded third-party interceptor should succeed in learning anything about the key only with a negligible probability.

Public-key cryptography, or asymmetric cryptography, is a cryptographic system that uses pairs of keys: public keys that may be known to others, and private keys, that are never be known by any except an owner. The generation of such key pairs depends on cryptographic algorithms. Effective security requires keeping the private key private, while the public key can be openly distributed without compromising security.

The term field refers to the finite fields as used in abstract algebra.

The term projection refers to multiple modulo arithmetic, for example, (((X mod 7) mod 3) mod 2).

Multi Modular-Functions ((x Mod p) Mod q))

Figure 1:
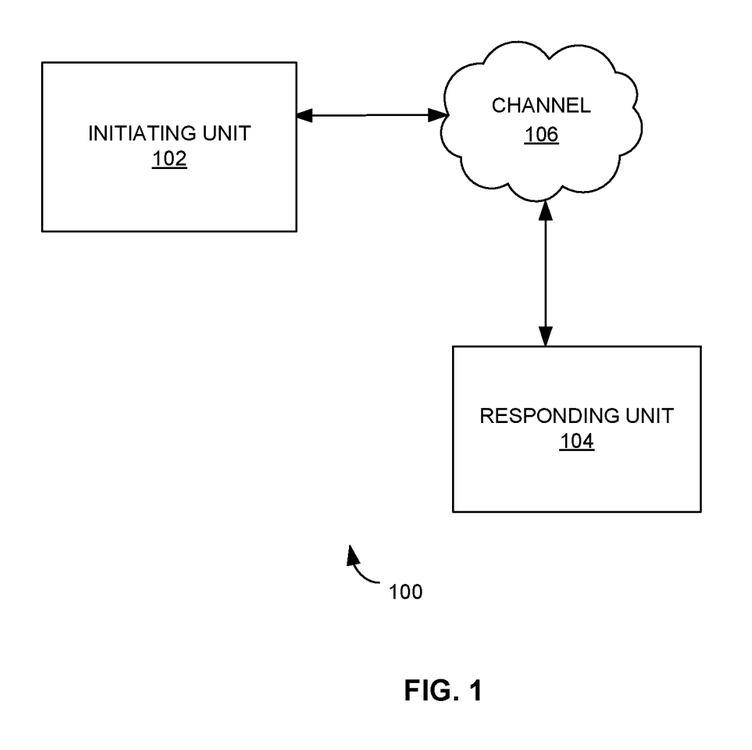
FIG. 1 is a block diagram that illustrates a system for establishing a secure communication agreement between an initiating unit and a responding unit through a channel according to some embodiments herein.

FIG. 1 is a block diagram that illustrates a system 100 for establishing a secure communication agreement between an initiating unit 102 and a responding unit 104 through a channel 106 according to some embodiments herein. The system 100 includes the initiating unit 102 and a responding unit 104 in communication with each other using the channel 106. The channel 106 may be a non-secure public channel. The initiating unit 102 or the responding unit 104 may be any suitable computing device such as a mobile device, a smartphone, a tablet, a laptop computer, a personal computer, or any combination thereof. The initiating unit 102 initiates the secret key agreement, (SKA) process.

The initiating unit 102 generates a set of multi-dimensional matrices M using a first set of local random numbers $(r_I)$ for a specified input parameters. The first set of local random numbers $(r_I)$ is known only to the initiating unit 102. The initiating unit 102 computes a transcript $(T_I)$ based on the set of multi-dimensional matrices M. The initiating unit 102 communicates the transcript $(T_I)$ to the responding unit 104. The initiating unit 102 waits for a response from the responding unit (104) after communicating the transcript $(T_I)$.

The responding unit 104, upon receiving the transcript $(T_I)$ from the initiating unit 102, determines a response $(T_R)$ by selecting a subset of the transcript $(T_I)$ by the responding unit 104. The responding unit 104 communicates the response $(T_R)$ to the initiating unit 102.

The subset of the transcript $(T_I)$ is selected after verifying the transcript $(T_I)$ for one or more constraints, based on a second set of local random numbers $(r_R)$. Upon receiving the response $(T_R)$ from the responding unit 104, the initiating unit 102 iteratively generates, communicates a subsequent transcript, and waits for a subsequent response from the responding unit 104 for one or more times as per requirement. Each of the subsequent transcript and the subsequent response at each iteration includes a subset of the subsequent transcript, the subsequent response at a previous iteration that satisfies one or more constraints verified using the subsequent transcript, the subsequent response at the previous iteration, and the first set of local random numbers $(r_I)$, the second set of local numbers $(r_R)$. The indices of the selected subset based on one or more constraints are referred to as J. The initiating unit 102 and responding unit 104 compute a secret key as a function of the first set of local random numbers $(r_I)$, the second set of local numbers $(T_R)$, the subsequent transcripts, the subsequent responses at each iteration, and the indices of the selected subset J. Hence a secure communication agreement is established based on the computed secret key between the initiating unit 102 and the responding unit 104 through the channel 106 to enable confidentiality integrity and authenticity of data without revealing the secret key to an unauthorized third-party unit.

In some embodiments, the initiating unit 102 and the responding unit 104 compute the secret key by (i) computing an intermediate set of values ($t_{Ij}$ and $t_{Rj}$) for which ($t_{Ij}+t_{Rj}$) is not equal to zero in Zp, a first function ($f_{snz}$) is a non-zero sum on $t_{Ij}$ and $t_{Rj}$ that is feebly correct and feebly private; (ii) verifying correctness of the first function ($f_{snz}$) to obtain a subset of $t_{Ij}$ and $t_{Rj}$ for which the function ($f_{snz}$) is fully correct and feebly private, the first function ($f_{snz}$) is fully correct when ($t_{Ij}+t_{Rj}$) is not equal to zero in Zp for all j in the subset; (iii) estimating a set of values $\Gamma_I$, $\Gamma R$, $Y_I$ and $Y_R$ using the first set of local random numbers ($r_I$), the second set of local numbers ($r_R$) and securely verifying $\Gamma_I \Gamma_R = Y_I + Y_R$ called as a second function $f_{sm}$ using $t_{Ij}$ and $t_{Rj}$ where the verification of $\Gamma_I \Gamma_R = Y_I + Y_R$ in $Z_3$ includes checking ($\Gamma_I + \Gamma_R + 1)^2 + 1 = t_{I1} + t_{R1} + 0$ and ($\Gamma_I + \Gamma_R - 1)^2 + 1 = t_{I2} + t_{R2} + 0$ by replacing $\Gamma_I \Gamma_R$ with $Y_I + Y_R$ in the expansion of $(\Gamma_I + \Gamma_R + 1)^2$ and $(\Gamma_I + \Gamma_R - 1)^2$ such that the second function $f_{sm}$ is now fully correct and feebly private; (iv) computing a set of secret keys ($K_I$ and $K_R$) that are fully correct and feebly private using the set of values, $K_I = \Gamma_I \Gamma_R - Y_I$ and $K_R = Y_R$ by publishing $\Gamma_I$ and $\Gamma_R$; and (v) computing a set of secret keys ($K_I$ and $K_R$) that are fully correct and feebly private using the set of values, $K_I = \Gamma_I \Gamma_R - Y_I$ and $K_R = Y_R$ by publishing $\Gamma_I$ and $\Gamma_R$. The feebly correct means that the first function produces correct outputs with a probability greater than zero but less than one. The feebly private means that privacy is ensured with non-zero probability greater than zero. The fully correct means that the first function produces the correct outputs with probability equal to one.

In some embodiments, the first set of local random numbers ($r_I$) or the second set of local numbers ($r_R$) in Zp by the initiating unit 102 or the responding unit 104 are selected arbitrarily as per pre-specified distributions and make random guesses of $G_{Rj}$ and $G_{Ij}$ such that their desired sum is $(r_R+r_I)^j$, which is then verified for correctness, Zp is a finite field that is used in abstract algebra.

In some embodiments, the correctness of the sum of $G_{Rj}$ and $G_{Ij}$ as ($r_I+r_R$) is verified in Zp by computing $(r_I+r_R+i)^{p-1}$ for different values of i and verifying the answer as one as long as ($r_I+r_R+i$) is non-zero, where $(r_I+r_R+i)^{p-1}$ is obtained by a linear combination of $G_{Rj}$ and $G_{Ij}$ for different values of i, which is locally computed as $h_{Ri}$ and $h_{Ii}$ and verifying whether ($h_{Ri}+h_{Ii}$) is 1 for all i, thereby resulting in an improved correctness and feebly privacy of $G_{Rj}$ and $G_{Ij}$.

In some embodiments, the verification of the correctness of sum of $G_{Rj}$ and $G_{Ij}$ is determined in other ways. The other ways may be computing some other function $r_I$ and $r_R$ for which the answer is known and can be used to verify.

In some embodiments, the privacy of the secret key is amplified by computing a function that is a linear combination of $G_{Rj}$ and $G_{Ij}$, the function is represented as $x_R$ and $x_I$, each of the intermediate set of values $t_I$ and $t_R$ is computed as multi-modular functions of $x_I$ and $x_R$, in particular, $t_I=((x_I \bmod p) \bmod q)$ and $t_R=((x_R \bmod p) \bmod q))$ such that ($t_I+t_R$) is non-zero in $Z_q$, and when q is very less than p, the privacy is significantly enhanced. In some embodiments, the multi-modular functions are other multi-modular functions, for example, $(((x^2_I \bmod p1) \bmod p2) \bmod p3 \ldots )$.

In some embodiments, the correctness is amplified by further verification checks and error correction procedures, resulting in a subset J of the indices for which the first function $f_{snz}$ is fully correct and feebly private over the intermediate set of values ($t_{Ij}$ and $t_{Rj}$).

In some embodiments, the error correction procedures are applied after generating the secret key or after generating the second function $f_{sm}$.

In some embodiments, the initiating unit 102 computes the computed secret key as a function of $\Gamma_I \Gamma_R$ and $Y_I$, the responding unit generates the generated secret key as a function of $Y_R$.

In some embodiments, the first function ($f_{snz}$) that is a non-zero sum on $t_I$ and $t_R$ without limitation is any non-linear function of $t_I$ and $t_R$.

In some embodiments, the sum ($r_I+r_R$), without limitation, is any polynomial.

In some embodiments, $t_I=(((x_I \bmod p1) \bmod p2) \bmod p3 \ldots )$ and $t_R=(((x_R \bmod p1) \bmod p2) \bmod p3 \ldots )$.

In some embodiments, the modular functions of $x_I$ and $x_R$ without limitation are modular functions or multi-modular functions.

In some embodiments, two fields Zp and Zq are used. Alternately, a different number of fields with a sequence of projections from one field to another may be used.

In some embodiments, the second function $f_{sm}$ without limitation is any non-linear function of $\Gamma_I$ and $\Gamma_R$ is equal to $Y_I+Y_R$.

In some embodiments, the first set of local random numbers and the second set of local random numbers are replaced in part or full with pseudo-random numbers, thereby, reducing the total number of bits that are sent.

The proof also provides a guarantee that the secret key will not be compromised in the future for an indefinite time based on the transcripts alone. The proposed system 100 also provides a set of deterministic steps to compute the shared secret key at both the initiating system and the responding system.

The secure communication system 100 includes a secure distributed operation of guess and check of functions of the shared secret variables between the initiating unit 102 and the responding unit 104 as described herein. Alternately, similar checks may be used for verifying similar kinds of guesses. The system 100 implements a distributed guess over the plurality of systems and verify the guesses at each of the plurality of systems. One field is projected to another using multiple modular operations and exploits the fact that incorrectness in one field may lead to privacy in the other and the unevenness in the distribution can help us get back to complete correctness. The system 100 converts a set of solutions, some of which may be secure, to a single security solution that is proven to be secure, thereby, achieving a provenly secret key agreement.

Figure 2:
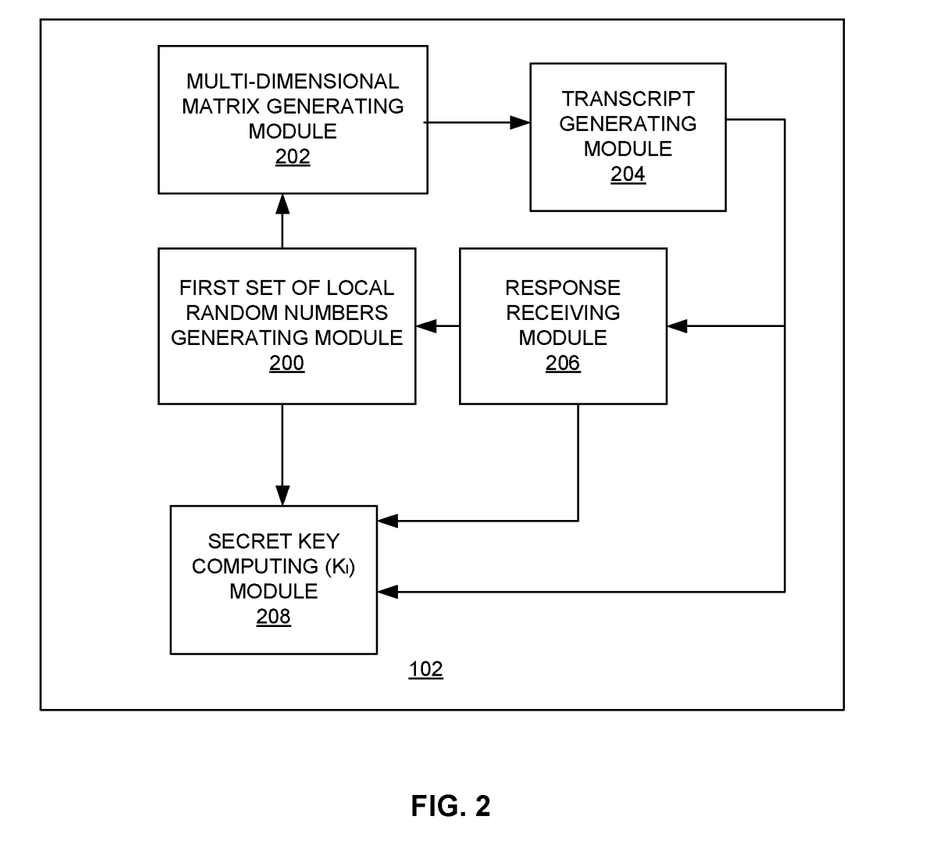
FIG. 2 is a block diagram of an initiating unit of FIG. 1 according to some embodiments herein.

FIG. 2 is a block diagram of an initiating unit 102 of FIG. 1 according to some embodiments herein. The initiating unit 102 includes a first set of local random numbers generating module 200, a multi-dimensional matrix generating module 202, a transcript generating module 204, a response receiving module 206, and a secret key computing ($K_I$) module 208. The first set of local random numbers generating module 200 includes a first set of local random numbers that are known only to the initiating unit 102. The multi-dimensional matrix generating module 202 generates a set of multi-dimensional matrices M using a first set of local random numbers ($r_I$) for a specified input parameters. The transcript generating module 204 computes a transcript ($T_I$) based on the set of multi-dimensional matrices M. The transcript generating module 204 communicates the transcript ($T_I$) to the responding unit 104. The response receiving module 206 waits for a response from the responding unit (104) after communicating the transcript ($T_I$) and receives the response ($T_R$) from the responding unit 104. Upon receiving the response ($T_R$) from the responding unit 104, the secret key computing ($K_I$) module 208 iteratively generates, communicates a subsequent transcript, and waits for a subsequent response from the responding unit 104 for one or more times as per requirement. The secret key computing ($K_I$) module 208 computes a secret key as a function of the first set of local random numbers ($r_I$), the second set of local numbers ($r_R$), the subsequent transcripts, the subsequent responses at each iteration, and the indices of the selected subset J.

Figure 3:
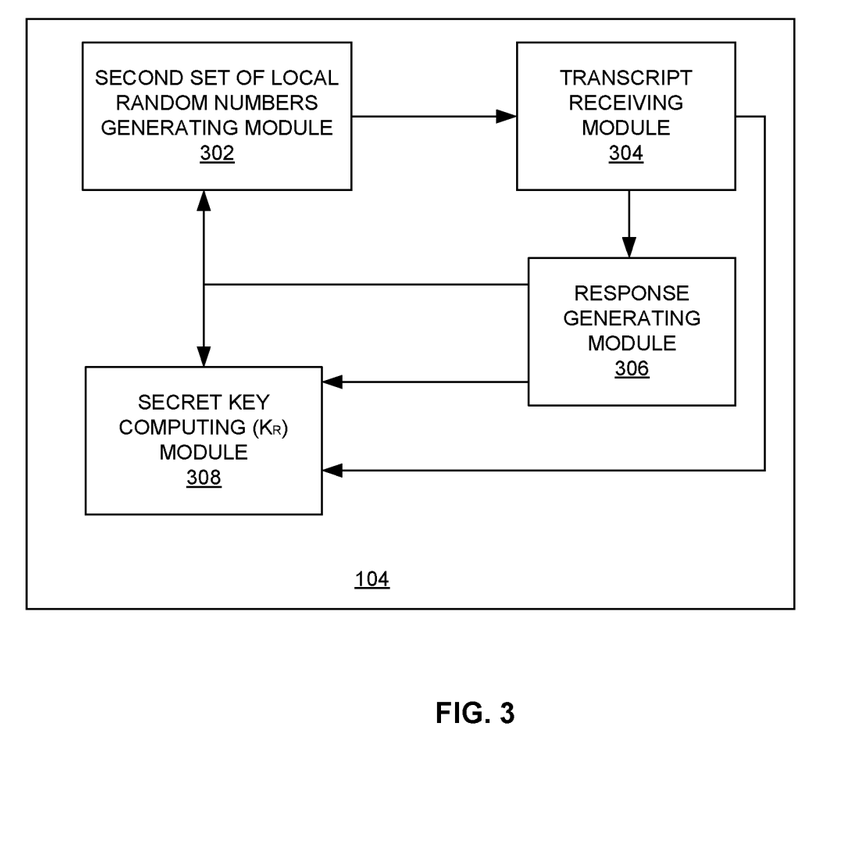
FIG. 3 is a block diagram of a responding unit of FIG. 1 according to some embodiments herein.

FIG. 3 is a block diagram of a responding unit 104 of FIG. 1 according to some embodiments herein. The responding unit 104 includes a second set of local random numbers generating module 302, a transcript receiving module 304, a response generating module 306, and a secret key computing ($K_R$) module 308. The second set of local random numbers generating module 302 includes a second set of local numbers ($r_R$). The transcript receiving module 304 receives the transcript ($T_I$) from the initiating unit 102. The response generating module 306 determines a response ($T_R$) by selecting a subset of the transcript ($T_I$) and communicates the response ($T_R$) to the initiating unit 102. The secret key computing ($K_R$) module 308 computes a secret key as a function of the first set of local random numbers ($r_I$), the second set of local numbers ($r_R$), the subsequent transcripts, the subsequent responses at each iteration, and the indices of the selected subset J.

Figure 4:
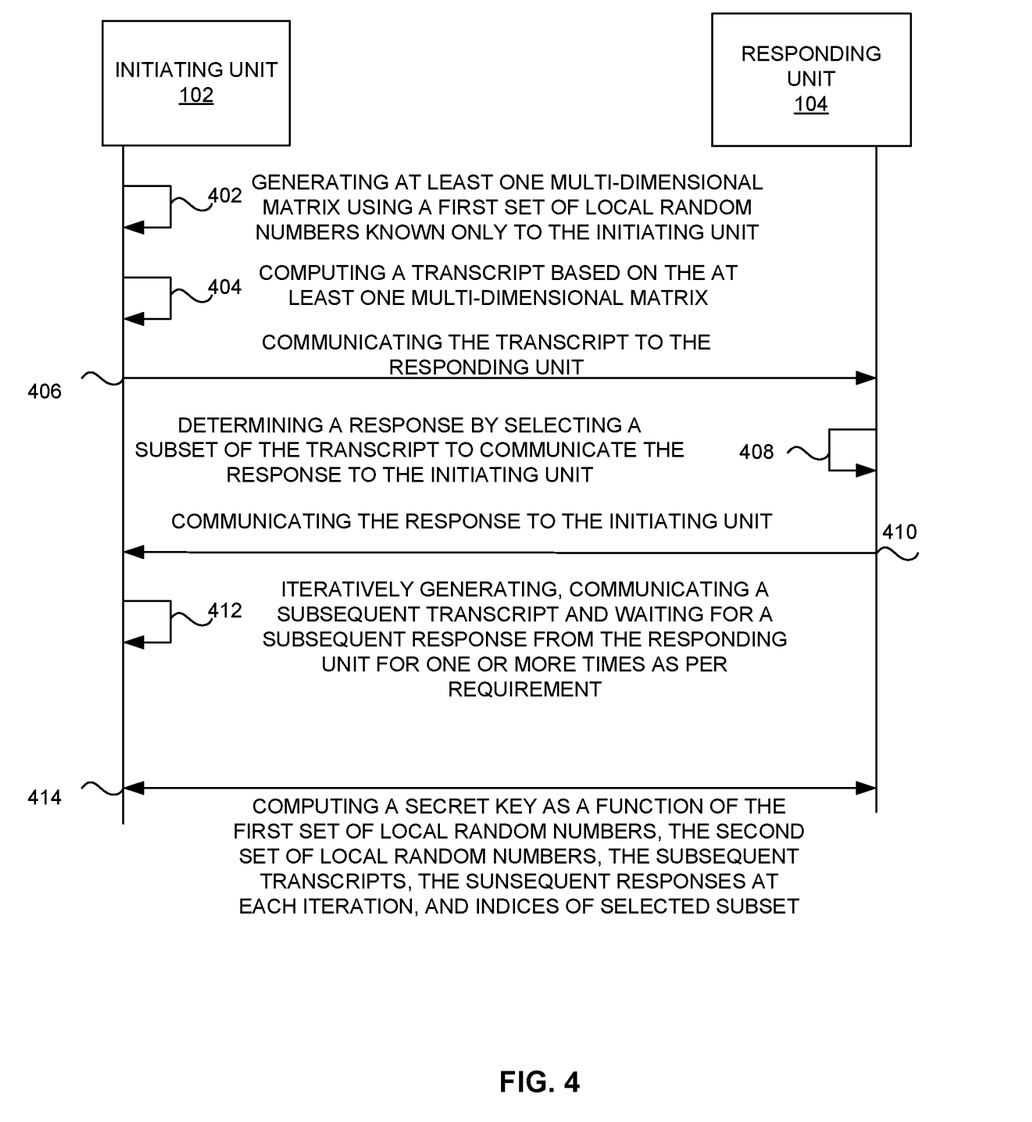
FIG. 4 is an interaction diagram that illustrates a method for establishing a secure communication agreement between an initiating unit and a responding unit through a channel according to some embodiments herein.

FIG. 4 is an interaction diagram that illustrates a method for establishing a secure communication agreement between an initiating unit 102 and a responding unit 104 through a channel 106 according to some embodiments herein. At step 402, the method includes generating, using a first set of local random numbers ($r_I$), at least one multi-dimensional matrix (M) for a specified input parameters by the initiating unit 102. At step 404, the method includes computing a transcript ($T_I$) by the initiating unit 102 based on the at least one multi-dimensional matrix (M). At step 406, the method includes communicating a transcript ($T_I$) by the initiating unit 102 to the responding unit 104. At step 408, the method includes determining a response ($T_R$) by selecting a subset of the transcript ($T_I$) to communicate the response ($T_R$) to the initiating unit 102. At step 410, the method includes communicating the response to the initiating unit 102. At step 412, the method includes iteratively generating, communicating a subsequent transcript, and waiting for a subsequent response from the responding unit 104 for one or more times as per requirement. At step 414, the method includes computing a secret key as a function of the first set of local random numbers ($r_I$), the second set of local numbers ($r_R$), the subsequent transcripts, the subsequent responses at each iteration, and the indices of the selected subset J.

Figure 5A:
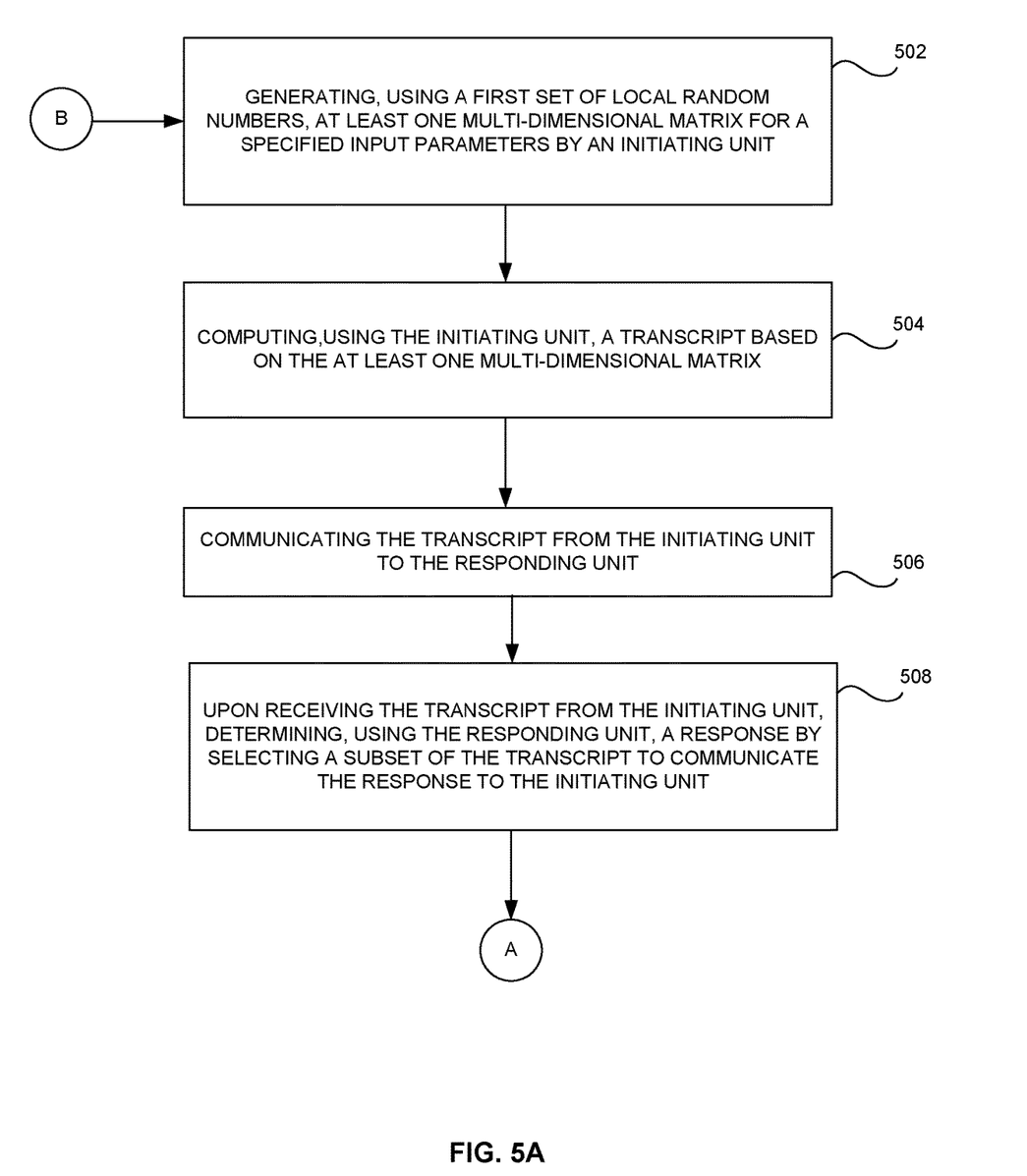
FIGS. 5A & 5B are flow diagrams that illustrate a method for establishing a secure communication agreement between an initiating unit and a responding unit through a channel according to some embodiments herein.
Figure 5B:
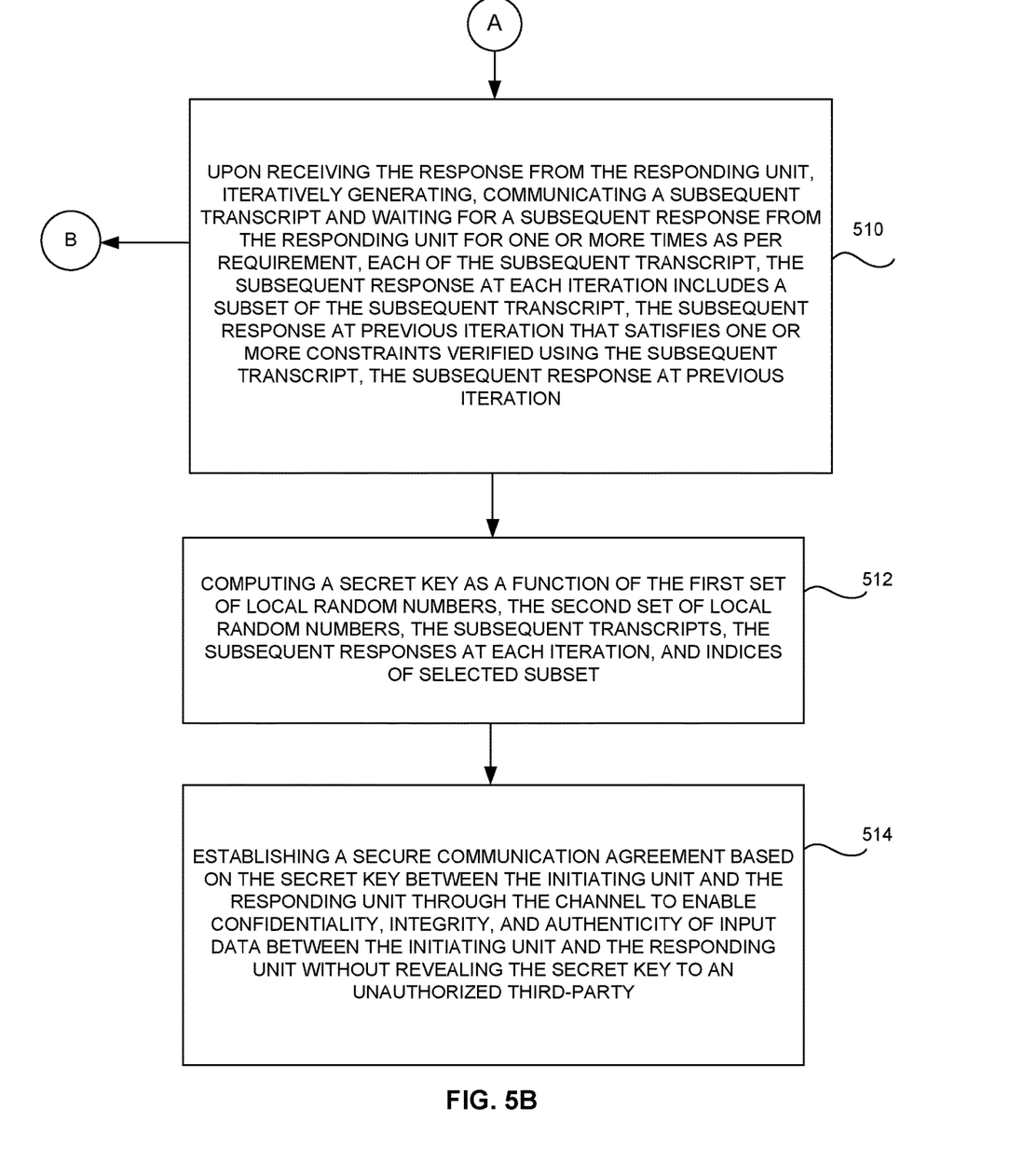

FIGS. 5A & 5B are flow diagrams that illustrate a method for establishing a secure communication agreement between an initiating unit 102 and a responding unit 104 through a channel 106 according to an embodiment herein. At step 502, the method includes generating, using a first set of local random numbers ($r_I$), at least one multi-dimensional matrix (M) for a specified input parameters by the initiating unit. In some embodiments, the first set of local random numbers is known only to the initiating unit. At step 504, the method includes computing, using the initiating unit, a transcript ($T_I$) based on the at least one multi-dimensional matrix (M). At step 506, the method includes communicating a transcript ($T_I$) from the initiating unit to the responding unit. In some embodiments, the initiating unit waits for a response from the responding unit after communicating the transcript ($T_I$). At step 508, the method includes upon receiving the transcript ($T_I$) from the initiating unit, determining, using the responding unit, a response ($T_R$) by selecting a subset of the transcript ($T_I$) to communicate the response ($T_R$) to the initiating unit. In some embodiments, the subset of the transcript ($T_I$) is selected after verifying the transcript ($T_I$) for one or more constraints, based on a second set of local random numbers ($r_R$). At step 510, the method includes upon receiving the response ($T_R$) from the responding unit, iteratively generating, communicating a subsequent transcript, and waiting for a subsequent response from the responding unit for one or more times as per requirement. In some embodiments, each of the subsequent transcript, the subsequent response at each iteration includes a subset of the subsequent transcript, the subsequent response at a previous iteration that satisfies one or more constraints verified using the subsequent transcript, the subsequent response at the previous iteration, and the first set of local random numbers ($r_I$), the second set of local numbers ($r_R$), indices of the selected subset based on one or more constraints are referred to as J. At step 512, the method includes computing a secret key as a function of the first set of local random numbers ($r_I$), the second set of local numbers ($r_R$), the subsequent transcripts, the subsequent responses at each iteration, and the indices of the selected subset J. At step 514, the method includes establishing the secure communication agreement based on the secret key between the initiating unit and the responding unit through the channel to enable confidentiality integrity and authenticity of data between the initiating unit and the responding unit without revealing the secret key to an unauthorized third-party unit.

In some embodiments, the initiating unit and the responding unit compute the secret key by (i) computing an intermediate set of values ($t_{Ij}$ and $t_{Rj}$) for which ($t_{Ij}+t_{Rj}$) is not equal to zero in Zp, a first function ($f_{snz}$) is a non-zero sum on $t_{Ij}$ and $t_{Rj}$ that is feebly correct and feebly private; (ii) verifying correctness of the first function ($f_{snz}$) to obtain a subset of $t_{Ij}$ and $t_{Rj}$ for which the function ($f_{snz}$) is fully correct and feebly private, the first function ($f_{snz}$) is fully correct when ($t_{Ij}+t_{Rj}$) is not equal to zero in Zp for all j in the subset; (iii) estimating a set of values $\Gamma_I$, $\Gamma_R$, $Y_I$ and $Y_R$ using the first set of local random numbers ($r_I$), the second set of local numbers ($r_R$) and securely verifying $\Gamma_I\Gamma_R=Y_I+Y_R$ called as a second function $f_{sm}$ using $t_{Ij}$ and $t_{Rj}$ where the verification of $\Gamma_I \Gamma_R=Y_I+Y_R$ in $Z_3$ includes checking $(\Gamma_I+\Gamma_R+1)^2+1=t_{I1}+t_{R1}\neq 0$ and $(\Gamma_I+\Gamma_R-1)^2+1=t_{I2}+t_{R2}\neq 0$ by replacing $\Gamma_I\Gamma_R$ with $Y_I+Y_R$ in the expansion of $(\Gamma_I+\Gamma_R+1)^2$ and $(\Gamma_I+\Gamma_R-1)^2$ such that the second function $f_{sm}$ is now fully correct and feebly private; (iv) computing a set of secret keys ($K_I$ and $K_R$) that are fully correct and feebly private using the set of values, $K_I=\Gamma_I\Gamma_R-Y_I$ and $K_R=Y_R$ by publishing $\Gamma_I$ and $\Gamma_R$; and (v) computing a set of secret keys ($K_I$ and $K_R$) that are fully correct and feebly private using the set of values, $K_I=\Gamma_I\Gamma_R-Y_I$ and $K_R=Y_R$ by publishing $\Gamma_I$ and $\Gamma_R$.

In some embodiments, the first set of local random numbers ($r_I$) or the second set of local numbers ($r_R$) in Zp by the initiating unit 102 or the responding unit 104 are selected arbitrarily as per pre-specified distributions and make random guesses of $G_{Rj}$ and $G_{Ij}$ such that their desired sum is $(r_R+r_I)^j$, which is then verified for correctness, Zp is a finite field that is used in abstract algebra.

In some embodiments, the correctness of sum of $G_{Rj}$ and $G_{Ij}$ as $(r_I+r_R)^j$ is verified in Zp by computing $(r_I+r_R+i)^{p-1}$ for different values of i and verifying the answer as one as long as $(r_I+r_R+i)$ is non-zero, where $(r_I+r_R+i)^{p-1}$ is obtained by a linear combination of $G_{Rj}$ and $G_{Ij}$ for different values of i, which is locally computed as $h_{Ri}$ and $h_{Ii}$ and verifying whether ($h_{Ri}+h_{Ii}$) is 1 for all i, thereby resulting in an improved correctness and feebly privacy of $G_{Rj}$ and $G_{Ij}$.

In some embodiments, the privacy of the secret key is amplified by computing a function that is a linear combination of $G_{Rj}$ and $G_{Ij}$, the function is represented as $x_R$ and $x_I$, each of the intermediate set of values $t_I$ and $t_R$ is computed as multi-modular functions of $x_I$ and $x_R$, in particular, $t_I=((x_I \bmod p) \bmod q)$ and $t_R=((x_R \bmod p) \bmod q)$ such that $(t_I+t_R)$ is non-zero in $Z_q$, and when q is very less than p, the privacy is significantly enhanced.

In some embodiments, the correctness is amplified by further verification checks and error correction procedures, resulting in a subset J of the indices for which the first function $f_{snz}$ is fully correct and feebly private over the intermediate set of values $(t_{Ij}$ and $t_{Rj})$.

In some embodiments, the initiating unit computes the computed secret key as a function of $\Gamma_I$, $\Gamma_R$ and $Y_I$, the responding unit generates the generated secret key as a function of $Y_R$.

Figure 6:
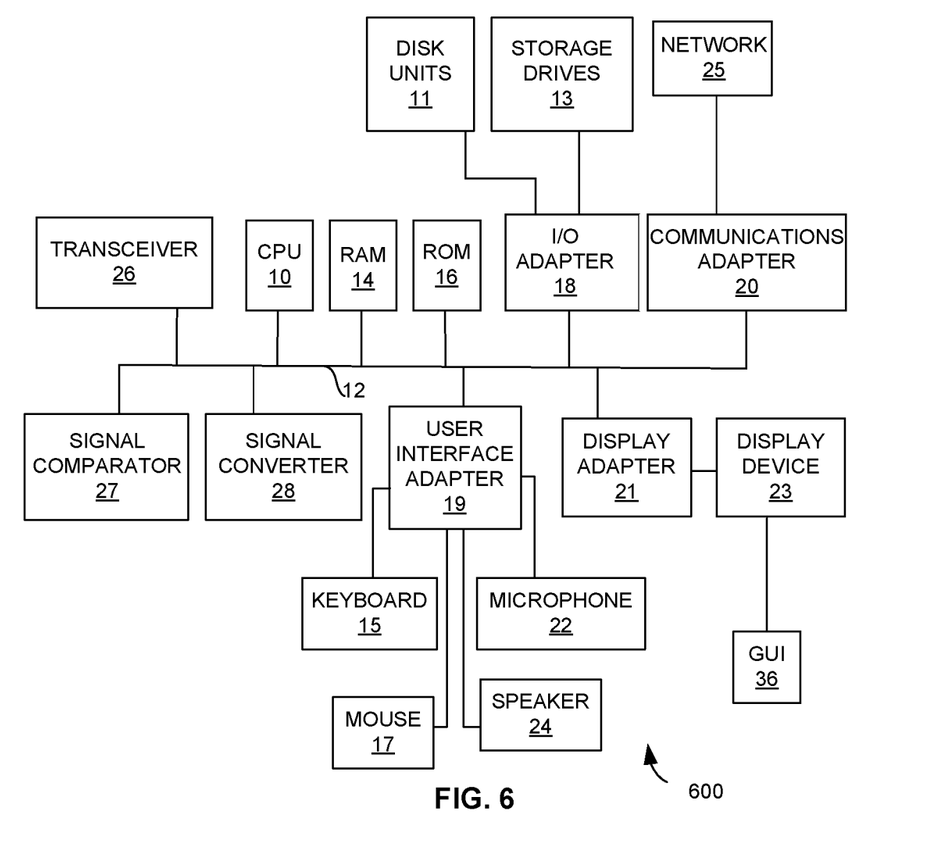
FIG. 6 illustrates a representative hardware environment for practicing the embodiments herein.

A representative hardware environment for practicing the embodiments herein is depicted in FIG. 6 with reference to FIGS. 1 through 5A & 5B. This schematic drawing illustrates a hardware configuration of system 600, in accordance with the embodiments herein. The hardware configuration includes at least one processing device and a cryptographic processor 11. The system 600 may include one or more of a personal computer, a laptop, a tablet device, a smartphone, a mobile communication device, a personal digital assistant, or any other such computing device, in one example embodiment. The system 600 includes one or more processor (e.g., the processor 102) or central processing unit (CPU) 10. The CPUs 10 are interconnected via system bus 12 to various devices such as a random-access memory (RAM) 14, read-only memory (ROM) 16, and an input/output (I/O) adapter 18. Although, CPUs 10 are depicted, it is to be understood that the system 700 may be implemented with only one CPU.

The I/O adapter 18 can connect to peripheral devices, such as disk units 11 and storage drives 13 (tape drives), or other program storage devices that are readable by the system. The system 600 can read the inventive instructions on the program storage devices and follow these instructions to execute the methodology of the embodiments herein. The system 600 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include compact disk-read-only memory (CD-ROM), compact disk-read/write (CD-R/W), and DVD.

A data processing system suitable for storing or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A system for establishing a secure communication agreement between an initiating unit and a responding unit through a channel, the system comprising:
   a memory;
   a processor that is configured to,
      generate, using a first set of local random numbers ($r_I$), at least one multi-dimensional matrix (M) for a specified input parameters by the initiating unit, wherein the first set of local random numbers is known only to the initiating unit;
      compute, using the initiating unit, a transcript ($T_I$) based on the at least one multi-dimensional matrix (M);
      communicate the transcript ($T_I$) from the initiating unit to the responding unit, wherein the initiating unit waits for a response from the responding unit after communicating the transcript ($T_I$);

upon receiving the transcript ($T_I$) from the initiating unit, determine, using the responding unit, a response ($T_R$) by selecting a subset of the transcript ($T_I$) to communicate the response ($T_R$) to the initiating unit, wherein the subset of the transcript ($T_I$) is selected after verifying the transcript ($T_I$) for a plurality of constraints, based on a second set of local random numbers ($r_R$);

upon receiving the response ($T_R$) from the responding unit, iteratively generate and communicate a subsequent transcript and wait for a subsequent response from the responding unit for a plurality of times as per requirement, wherein each of the subsequent transcript and the subsequent response at each iteration comprises a subset of the subsequent transcript and the subsequent response at a previous iteration that satisfies the plurality of constraints verified using the subsequent transcript and the subsequent response at the previous iteration, and the first set of local random numbers ($r_I$), the second set of local numbers ($r_R$), wherein indices of the selected subset based on the plurality of constraints are referred to as J;

compute a secret key as a function of the first set of local random numbers ($r_I$), the second set of local numbers ($r_R$), the subsequent transcript and the subsequent response at each iteration, and the indices of the selected subset J; and establish the secure communication agreement based on the secret key between the initiating unit and the responding unit through the channel to enable confidentiality integrity and authenticity of data between the initiating unit and the responding unit without revealing the secret key to an unauthorized third-party unit.

2. The system as claimed in claim 1, wherein the processor is configured to compute the secret key using the initiating unit and the responding unit by, computing an intermediate set of values ($t_{Ij}$ and $t_{Rj}$) for which ($t_{Ij}+t_{Rj}$) is not equal to zero in Zp, a first function ($f_{snz}$) is a non-zero sum on $t_{Ij}$ and $t_{Rj}$ that is feebly correct and feebly private, wherein Zp is a finite field that is used in abstract algebra;

verifying correctness of the first function ($f_{snz}$) to obtain a subset of $t_{Ij}$ and $t_{Rj}$ for which the function ($f_{snz}$) is fully correct and the feebly private, wherein the first function ($f_{snz}$) is fully correct when ($t_{Ij}+t_{Rj}$) is not equal to zero in Zp for all j in the subset;

estimating a set of values $\Gamma_I$, $\Gamma_R$, $Y_I$ and $Y_R$ using the first set of local random numbers ($r_I$), the second set of local numbers ($r_R$), and securely verifying $\Gamma_I \Gamma_R = Y_I + Y_R$ called as a second function $f_{sm}$ using $t_{Ij}$ and $t_{Rj}$ where the verification of $\Gamma_I \Gamma_R = Y_I + Y_R$ in $Z_3$ comprises of checking $(\Gamma_I+\Gamma_R+1)^2+1=t_{I1}+t_{R1}\neq 0$ and $(\Gamma_I+\Gamma_R-1)^2+1=t_{I2}+t_{R2}\neq 0$ by replacing $\Gamma_I \Gamma_R$ with $Y_I+Y_R$ in the expansion of $(\Gamma_I+\Gamma_R+1)^2$ and $(\Gamma_I+\Gamma_R-1)^2$ such that the second function $f_{sm}$ is now fully correct and feebly private; and computing a set of secret keys ($K_I$ and $K_R$) that are fully correct and feebly private using the set of values, wherein $K_I=\Gamma_I \Gamma_R - Y_I$ and $K_R=Y_R$ by publishing $\Gamma_I$ and $\Gamma_R$.

3. The system of claim 1, wherein the processor is configured to select the first set of local random numbers ($r_I$) or the second set of local numbers ($r_R$) in Zp by the initiating unit or the responding unit arbitrarily as per pre-specified distributions and make random guesses of $G_{Rj}$ and $G_{Ij}$ such that their desired sum is $(r_R+r_I)^j$, which is then verified for correctness.

4. The system of claim 3, wherein the processor is configured to verify in Zp the correctness of sum of $G_{Rj}$ and $G_{Ij}$ as $(r_I+r_R)$ by computing $(r_I+r_R+i)^{p-1}$ for different values of i and verifying the answer as one as long as $(r_I+r_R+i)$ is non-zero, where $(r_I+r_R+i)^{p-1}$ is obtained by a linear combination of $G_{Rj}$ and $G_{Ij}$ for different values of i, which is locally computed as $h_{Ri}$ and hui and verifying whether ($h_{Ri}+h_{Ii}$) is 1 for all i, thereby resulting an improved correctness and feebly privacy of $G_{Rj}$ and $G_{Ij}$.

5. The system of claim 2, wherein the privacy of the secret key is amplified by computing the linear combination function of $G_{Rj}$ and $G_{Ij}$, wherein the linear combination function is represented as $x_R$ and $x_I$, wherein each of the intermediate set of values $t_I$ and $t_R$ is computed as multi-modular function of $x_I$ and $x_R$, in particular, $t_I=((x_I \mod p) \mod q)$ and $t_R=((x_R \mod p) \mod q)$) such that $(t_I+t_R)$ is non-zero in $Z_q$, and when q is less than p, the privacy is significantly enhanced.

6. The system of claim 2, wherein the correctness is amplified by further verification checks and error correction procedures, resulting in a subset J of the indices for which the first function $f_{snz}$ is fully correct and feebly private over the intermediate set of values ($t_{Ij}$ and $t_{Rj}$).

7. The system of claim 4, wherein the initiating unit computes the computed secret key as a function of $\Gamma_I \Gamma_R$ and $Y_I$, wherein the responding unit generates the generated secret key as a function of $Y_R$.

8. A processor-implemented method for establishing a secure communication agreement between an initiating unit and a responding unit through a channel, the method comprising:

generating, using a first set of local random numbers ($r_I$), at least one multi-dimensional matrix (M) for a specified input parameters by the initiating unit, wherein the first set of local random numbers is known only to the initiating unit;

computing, using the initiating unit, a transcript ($T_I$) based on the at least one multi-dimensional matrix (M);

communicating the transcript ($T_I$) from the initiating unit to the responding unit, wherein the initiating unit waits for a response from the responding unit after communicating the transcript ($T_I$);

upon receiving the transcript ($T_I$) from the initiating unit, determining, using the responding unit, a response ($T_R$) by selecting a subset of the transcript ($T_I$) to communicate the response ($T_R$) to the initiating unit, wherein the subset of the transcript ($T_I$) is selected after verifying the transcript ($T_I$) for a plurality of constraints, based on a second set of local random numbers ($r_R$);

upon receiving the response ($T_R$) from the responding unit, iteratively generating and communicating a subsequent transcript and waiting for a subsequent response from the responding unit for a plurality of times as per requirement, wherein each of the subsequent transcript and the subsequent response at each iteration comprises a subset of the subsequent transcript and the subsequent response at a previous iteration that satisfies the plurality of constraints verified using the subsequent transcript, the subsequent response at the previous iteration, and the first set of local random numbers ($r_I$), the second set of local numbers ($r_R$), wherein indices of the selected subset based on the plurality of constraints are referred to as J;

computing a secret key as a function of the first set of local random numbers ($r_I$), the second set of local numbers ($r_R$), the subsequent transcript, and the subsequent response at each iteration, and the indices of the selected subset J; and establishing the secure communication agreement based on the secret key between the initiating unit and the responding unit through the channel to enable confidentiality integrity and authenticity of data between the initiating unit and the responding unit without revealing the secret key to an unauthorized third-party unit.

9. The processor-implemented method of claim 8, wherein the method comprises computing the secret key using the initiating unit and the responding unit by, computing an intermediate set of values ($t_{Ij}$ and $t_{Rj}$) for which ($t_{Ij}+t_{Rj}$) is not equal to zero in Zp, a first function ($f_{snz}$) is a non-zero sum on $t_{Ij}$ and $t_{Rj}$ that is feebly correct and feebly private, wherein Zp is a finite field that is used in abstract algebra;

verifying correctness of the first function ($f_{snz}$) to obtain a subset of $t_{Ij}$ and $t_{Rj}$ for which the function ($f_{snz}$) is fully correct and feebly private, wherein the first function ($f_{snz}$) is fully correct when ($t_{Ij}+t_{Rj}$) is not equal to zero in Zp for all j in the subset;

estimating a set of values $\Gamma_I$, $\Gamma_R$, $Y_I$ and $Y_R$ using the first set of local random numbers ($r_I$), the second set of local numbers ($r_R$) and securely verifying $\Gamma_I \Gamma_R = Y_I + Y_R$ called as a second function $f_{sm}$ using $t_{Ij}$ and $t_{Rj}$ where the verification of $\Gamma_I \Gamma_R = Y_I + Y_R$ in $Z_3$ comprises of checking $(\Gamma_I+\Gamma_R+1)^2+1=t_{I1}+t_{R1}\neq 0$ and $(\Gamma_I+\Gamma_R-1)^2+1=t_{I2}+t_{R2}\neq 0$ by replacing $\Gamma_I \Gamma_R$ with $Y_I+Y_R$ in the expansion of $(\Gamma_I+\Gamma_R+1)^2$ and $(\Gamma_I+\Gamma_R-1)^2$ such that the second function $f_{sm}$ is now fully correct and feebly private; and computing a set of secret keys ($K_I$ and $K_R$) that are fully correct and feebly private using the set of values, wherein $K_I=\Gamma_I \Gamma_R-Y_I$ and $K_R=Y_R$ by publishing $\Gamma_I$ and $\Gamma_R$.

10. The processor-implemented method of claim 8, wherein the method comprises selecting the first set of local random numbers ($r_I$) or the second set of local numbers ($r_R$) in Zp by the initiating unit or the responding unit arbitrarily as per pre-specified distributions and make random guesses of $G_{Rj}$ and $G_{Ij}$ such that their desired sum is $(r_R+r_I)^j$, which is then verified for correctness.

* * * * *